United States Patent Office 2,819,266
Patented Jan. 7, 1958

2,819,266

MANUFACTURE OF MELAMINE

John J. Healy, Jr., St. Louis, Mo., and Colver P. Dyer, Winchester, Mass., assignors to Monsanto Chemical Company, St. Louis, Mo., a corporation of Delaware No Drawing. Application September 20, 1955
Serial No. 535,537

3 Claims. (Cl. 260—249.7)

The present invention relates to a process for the manufacture of 2,4,6-triamino-1,3,5-triazine, more commonly known as melamine.

In the past, melamine has been produced by a variety of procedures, the more prominent of which is that known as the dicyandiamide process, wherein dicyandiamide is heated to produce melamine according to the following equation:

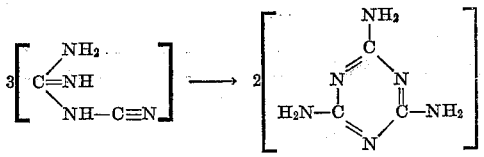

Generally the reaction above set forth has been carried out under positive pressure, and frequently in the presence of certain additive materials, such as, for example, ammonia, organic solvents, catalysts and the like, in order to control the reaction. Obviously, an objection to the dicyandiamide process is the use of relatively expensive dicyandiamide as a starting material. Other objections involve the use of additive materials such as, for example, solvents and the like, which further add to the cost of manufacture.

An object of the present invention is to provide a new process for the manufacture of melamine.

A further object is to provide a process for the manufacture of melamine employing relatively cheap starting materials.

Other objects will be apparent from the disclosure hereinafter set forth.

In accordance with the present invention melamine is prepared by heating urea, preferably in the presence of added ammonia, in one of two pressure-resistant reactors connected in series, the reactor containing the urea being heated to a temperature between 250° and 350° C. for a period of 1 to 2.5 hours with the lower heating period corresponding to the higher temperature while maintaining the other reactor at a temperature of about 90 to 115° C. Extraneous material collects in the other reactor, that is, the reactor which is maintained at the lower temperature. The conversion of urea to melamine can be carried out in the presence of a small amount of an ammonium halide catalyst such as ammonium chloride or ammonium bromide or an ammonium salt of an aliphatic monocarboxylic acid as, for example, ammonium acetate, ammonium formate and the like. However, the processes of this invention are readily carried out in the absence of a catalyst.

The overall equation for the reaction is believed to be as follows:

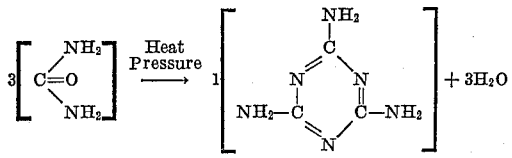

The above equation, which is hereinafter referred to as Equation I, calls for the production of 1 mol of melamine from 3 mols of urea.

However, another overall equation has been proposed for the reaction and this is given below:

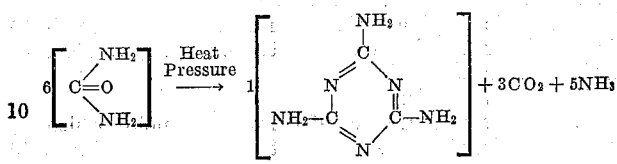

According to this equation, which is hereinafter referred to as Equation II, 6 mols of urea are required to produce 1 mol of melamine. Thus, if the yield of melamine from urea is calculated on the basis of urea employed, the yield of melamine will be twice as great for Equation II than for Equation I.

On the basis of data obtained, it appears that the reaction under the conditions employed in this invention follows Equation II rather than Equation I, but this is unimportant except in respect to the calculation of yields.

As is indicated above, the conversion of urea to melamine is carried out at temperatures between 250° C. and 350° C. within a period of 1 to 2.5 hours. Pressures sufficiently high to minimize formation of intermediate and decomposition products such as, for example, biuret, cyanuric acid, ammelide and cyanic acid at the temperatures used are employed. Thus, pressures between substantially 600 and 5000 pounds per square inch (gauge) or even higher have been employed. However, an important advantage of this invention is that low pressures can be employed, and it is preferred to carry out the conversion of urea to melamine at pressures of about 600 to 2500 pounds per square inch (gauge).

By carrying out the process of this invention, high yields of melamine are obtained at relatively low temperatures and relatively short heating periods, and it has not been possible heretofore to obtain high yields under similar conditions, in the absence of a catalyst, by the use of a single reactor or autoclave.

The invention will be more completely understood from the following specific examples, illustrating but not limiting the scope of this invention.

*Example I*

Sixty parts by weight of urea were placed in an autoclave, and about 30 parts by weight of liquid ammonia were placed in a second autoclave. The two autoclaves were connected in series and the autoclaves and contents were then heated. The autoclave containing the urea was heated slowly up to a temperature of about 250° C., and maintained at a temperature of 250° C. to 350° C. for 2.5 hours, meanwhile heating the second autoclave containing the ammonia to a temperature of about 100° C. to 115° C., the pressure in the autoclaves being about 1000 to 1200 pounds per square inch. After allowing the reaction mass to cool and releasing the pressure, and extracting the reaction mass with boiling water, a yield of 19.4 parts of melamine or 46% of theoretical, based on Equation I, was obtained from the reaction product of the first reactor. The yield of melamine was 92% of theoretical based on Equation II.

*Example II*

In this example, the procedure of employing two autoclaves as in Example I was used. Sixty parts by weight of urea were placed in the first autoclave and about 25 parts by weight of liquid ammonia were placed in the second autoclave. The first autoclave was heated slowly up to a temperature of about 250° C., and maintained at a temperature of 250° C. to 350° C. for about one hour, meanwhile heating the second autoclave to a temperature of about 90° C. to 100° C., the pressure in the autoclaves being between about 800 and 850 pounds per square inch (gauge). On allowing the reaction mass to cool, and extracting it with boiling water, a yield of 18.3 parts by weight of melamine or 43.5% of theoretical, based on Equation I, was obtained. This yield was 87% of theoretical based on Equation II.

This application is a continuation-in-part of our copending application, Serial No. 661,350, filed April 11, 1946, now abandoned.

What is claimed is:

1. A process for the manufacture of melamine which comprises charging urea to one of two pressure-resistant reactors connected in series and charging liquid ammonia to the other reactor, heating the urea in the reactor to which it is charged to a temperature of 250° C. to 350° C. and at a pressure of 600 to 2500 pounds per square inch in the presence of ammonia from said reactor to which ammonia was charged for a period of 1 to 2.5 hours, with the longer heating period corresponding to the lower temperatures, while maintaining the reactor to which ammonia was charged at a temperature of about 90 to 115° C., whereby melamine is produced in high yield in the reactor to which urea was charged and extraneous matter collects in the other reactor, and recovering said melamine.

2. A process for the manufacture of melamine which comprises charging urea to one of two pressure-resistant reactors connected in series and charging liquid ammonia to the other reactor, heating the urea in the reactor to which it is charged to a temperature of 250° C. to 350° C. and at a pressure of about 1000 to 1200 pounds per square inch in the presence of ammonia from the reactor to which ammonia was charged for a period of 2.5 hours, while maintaining the reactor to which ammonia was charged at a temperature of about 100 to 115° C., whereby melamine is produced in high yield in the reactor to which urea was charged, and recovering said melamine.

3. A process for the manufacture of melamine which comprises charging urea to one of two pressure-resistant reactors connected in series and charging liquid ammonia to the other reactor, heating the urea in the reactor to which it is charged to a temperature of 250° C. to 350° C. and at a pressure of about 800 to 850 pounds per square inch in the presence of ammonia from the reactor to which ammonia was charged for a period of about 1 hour, while maintaining the reactor to which ammonia was charged at a temperature of about 90 to 100° C., whereby melamine is produced in high yield in the reactor to which urea was charged, and recovering said melamine.

References Cited in the file of this patent

UNITED STATES PATENTS

| | | |
|---|---|---|
| 2,312,754 | Davy | Mar. 2, 1943 |
| 2,566,231 | Paden | Aug. 28, 1951 |